March 5, 1968  F. C. CHARBONNET  3,371,408
METHOD OF MANUFACTURING HOSE JOINT ELEMENTS
Filed July 7, 1965
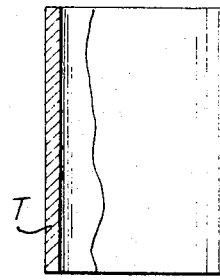
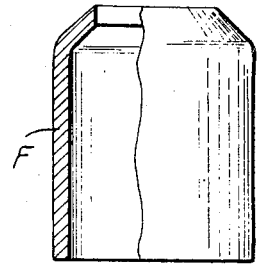
FIG.1a.  FIG.1b.
FIG.2.  FIG.3.
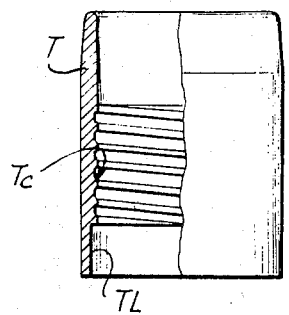
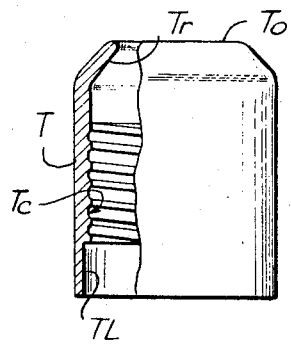
FIG.4.  FIG.5.
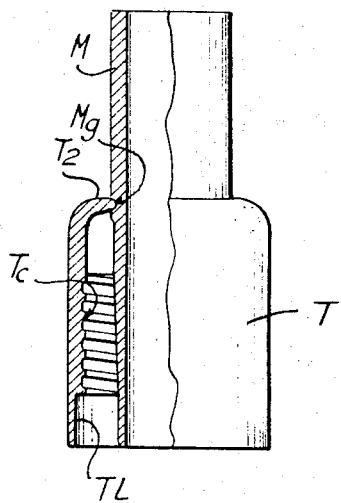
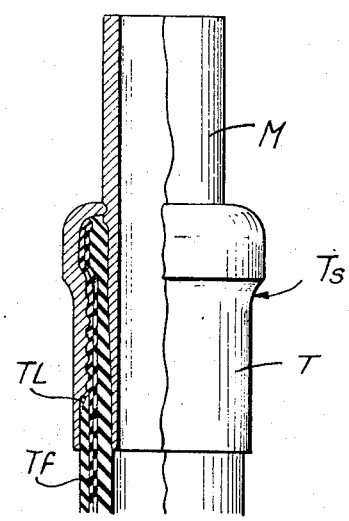
INVENTOR.
FRANCIS C. CHARBONNET
BY Karl G. Ross
Attorney

United States Patent Office 3,371,408
Patented Mar. 5, 1968

3,371,408
METHOD OF MANUFACTURING HOSE JOINT ELEMENTS
Francis Charles Charbonnet, % Cie des Raccords and Robinets, Ave. Florissant, Annemasse, Haute-Savoie, France
Filed July 7, 1965, Ser. No. 470,009
Claims priority, application France, July 9, 1964, 981,244, Patent 1,408,901
3 Claims. (Cl. 29—508)

This invention is concerned with a novel method of manufacturing bells and nipples of hose joints, and more particularly with a method of shaping parts of this character to be crimped on flexible hoses.

Nowadays these parts are made entirely by turning, which makes them expensive without imparting an exceptional quality thereto.

It is the object of the present invention to produce bell and nipple hose joints and notably the bell thereof which are characterized by a relatively low cost and a quality at least equal to that of entirely turned bells.

The method of this invention is characterized in principle by the following sequence of steps:

At one end of a cylindrical socket a frustoconical inner flange is formed, and teeth, notches, grooves or screw threads formed in the inner wall of the socket;

At the same time, a tubular nipple having a peripheral groove is prepared;

This nipple is introduced into the opening formed in the inner frustoconical flange of the socket and the latter is crimped by using a press on said nipple so that the edges of said opening engage said groove;

The end of the flexible hose is inserted after having stripped the sheath therefrom; and The skirt of said socket is crimped on the stripped hose end to seal the joint and anchor this socket on said hose end.

According to a first form of embodiment of this invention said socket formed with an inner frustoconical flange is obtained by effecting a stamping or drop-forging operation.

According to an alternate form of embodiment of this invention the socket is obtained from a cylindrical tube blank to which an internal turning operation is applied to form the notches, teeth or threads, followed by another external turning operation for obtaining the desired lateral surface appearance one end being subsequently narrowed in a press.

Other features and advantages of this invention will appear as the following description proceeds with reference to the attached drawing showing by way of example typical forms of embodiment of the present invention. In the drawing:

FIGURE 1a is a part sectional view showing a cylindrical tube blank;

FIGURE 1b shows the stamped and drop forged tubular body;

FIGURE 2 shows the socket after the turning operation;

FIGURE 3 shows the inner frustoconical flange formed in a press;

FIGURE 4 is a part-sectional view showing the socket thus obtained after the crimping thereof on a grooved nipple, and FIGURE 5 illustrates the final step with the socket or bell crimped on the hose.

As will be readily seen from the various figures of the drawing, the method of this invention utilizes elementary blanks such as a tube section T (see FIGURE 1a) or a stamped or drop forged piece F (FIGURE 1b). If a tube section or blank T is used, the tube is turned internally to form a plurality of grooves $Tc$ (for subsequently clamping the hose $Tf$) as well as an end portion $TL$ of slightly greater diameter adapted to receive the non stripped portion of said hose $Tf$, an external turning operation being added if desired with a view to impart to the lateral surface of the socket or bell the desired contour and notably a gradual reduction in thickness towards the end chamber $TL$. Then the socket is subjected to a press operation to form the frustoconical flange $Tr$ (FIGURE 3). If the initial blank is forged or stamped F only the inner turning steps $Tc$ and $TL$ are carried out.

At the same time a nipple M is prepared by forming a groove $Mg$ in the outer wall of a tubular section.

This nipple is subsequently introduced into the end opening of the inner frustoconical flange $Tr$ and the edges of this inner flange are crimped into said groove $Mg$. The flexible hose $Tf$, preferably stripped of its external sheath down to its armouring mesh or like structure by removing the outer layer of elastic material, is inserted into the annular space formed between said nipple M and said socket or bell T until the non stripped portion engages the shoulder in the end chamber $TL$.

A complementary crimping operation is performed at $Ts$ by shrinking the skirt of the bell and thus altering the shape of said hose between T and M.

It will be noted that the above described manufacturing steps reduce turning operations to a minimum, thus reducing the cost in proportion, without inasmuch impairing the technical properties of the resulting joint.

What I claim is:
1. Method of manufacturing a hose joint of the bell-and-spigot type, comprising on the one hand an external bell and an internal tubular nipple, and of securing said bell on a hose end comprising a reinforcing mesh structure embedded in an external layer and an inner layer of flexible material, this method comprising the steps of:

imparting to said external bell the shape of a cylindrical skirt provided with a frustoconical inner flange;

forming in the inner wall of said skirt a plurality of retaining grooves;

machining a tubular nipple by forming an external peripheral groove therein;

inserting said nipple into the opening of said inner frustoconical flange of said bell;

crimping the inner edge of said flange into the external groove of said nipple;

stripping the hose end by removing said external layer of flexible material;

inserting said stripped end of said hose into the space formed between said skirt and said nipple;

crimping said skirt on said hose end and said nipple until said end is anchored in said retaining grooves in order to seal the joint between said bell and nipple and safely hold said hose within said bell.

2. Method as set forth in claim 1, characterized in that the external shape of the cylindrical bell with frustoconical inner flange is obtained by stamping or drop-forging.

3. Method as set forth in claim 1, characterized in that one end of a tubular cylindrical blank is shaped by turning to form a frustoconical section thereof before forming said inner frustoconical flange.

References Cited

UNITED STATES PATENTS

| | | | |
|---|---|---|---|
| 2,310,536 | 2/1943 | Melsom | 29—508 |
| 2,341,003 | 2/1944 | Watson | 285—256 |
| 2,453,997 | 11/1948 | MacWilliam | 285—256 |
| 2,808,643 | 10/1957 | Weatherhead | 29—508 |
| 2,985,342 | 5/1961 | Focht | 29—520 X |
| 2,121,624 | 6/1938 | Cowles | 285—256 |
| 2,374,270 | 4/1945 | Brock | 29—511 |

FOREIGN PATENTS 610,426   10/1948   Great Britain.

CHARLIE T. MOON, *Primary Examiner.*